(12) United States Patent
Eisner

(10) Patent No.: US 11,785,674 B2
(45) Date of Patent: *Oct. 10, 2023

(54) MULTIPLE PILLAR LIQUID HEATER

(71) Applicant: Group B Labs, Inc., Seattle, WA (US)

(72) Inventor: Illi Eisner, Seattle, WA (US)

(73) Assignee: Group B Labs, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,855

(22) Filed: Jan. 3, 2022

(65) Prior Publication Data

US 2022/0124878 A1  Apr. 21, 2022

Related U.S. Application Data

(63) Continuation of application No. 16/674,877, filed on Nov. 5, 2019, now Pat. No. 11,219,099, which is a
(Continued)

(51) Int. Cl.
*H05B 3/40* (2006.01)
*B01F 33/45* (2022.01)
*A47J 36/24* (2006.01)

(52) U.S. Cl.
CPC .............. *H05B 3/40* (2013.01); *B01F 33/45* (2022.01); *A47J 36/2433* (2013.01); *H05B 2203/021* (2013.01)

(58) Field of Classification Search
CPC ..... H05B 3/40; H05B 2203/021; B01F 13/08; A47J 36/2433; A47J 43/042; A47J 43/046;
(Continued)

(56) References Cited

U.S. PATENT DOCUMENTS 2,950,754 A * 8/1960 Bertie ................. F02N 19/10
431/66
3,351,130 A * 11/1967 Lowe .................. F24D 1/005
122/15.1
(Continued)

FOREIGN PATENT DOCUMENTS

CN 103082861 5/2013
CN 204133179 2/2015
(Continued)

OTHER PUBLICATIONS

Notice of Allowance dated Sep. 1, 2021; U.S. Appl. No. 16/674,877; 12 pages.
(Continued)

*Primary Examiner* — Justin M Jonaitis
(74) *Attorney, Agent, or Firm* — McIver IP, PLLC

(57) ABSTRACT

Devices, systems, and apparatuses for heating a liquid are disclosed herein. In one embodiment, a heater includes a base comprising a generally planar surface and at least two heater pillars and a sensor pillar configured on the base. The at least two heater pillars each comprise heating elements. The sensor pillar includes a thermal sensor. A mixing element is configured on the generally planar surface of the base and is coupled to a mixing motor. When powered, the heating elements of the heater pillars are configured to generate heat and the mixing motor is configured to cause the mixing element to rotate.

20 Claims, 10 Drawing Sheets

Related U.S. Application Data continuation-in-part of application No. 16/040,523, filed on Jul. 19, 2018, now Pat. No. 11,337,556.

(60) Provisional application No. 62/755,795, filed on Nov. 5, 2018, provisional application No. 62/534,641, filed on Jul. 19, 2017.

(58) Field of Classification Search
CPC .. A47J 43/0465; A47J 36/244; A47J 41/0094; A47J 41/0072; A47J 41/0038; A47J 41/02; A61J 9/02; A61J 11/0075; A61J 2200/70; A61J 2200/76; A61J 2205/60
USPC ......... 137/341; 215/11.2; 122/4 a, 14.1, 14.2
See application file for complete search history.

(56) References Cited

U.S. PATENT DOCUMENTS

| | | | |
|---|---|---|---|
| 3,892,945 A | 7/1975 | Lerner | |
| 4,377,737 A * | 3/1983 | Berry | F22B 1/284 |
| | | | 392/401 |
| 5,588,557 A | 12/1996 | Topar | |
| 5,692,885 A * | 12/1997 | Langer | F04C 2/18 |
| | | | 417/32 |
| 6,864,462 B2 | 3/2005 | Sanoner et al. | |
| 7,903,958 B2 * | 3/2011 | Tsai | F24H 1/101 |
| | | | 137/340 |
| 7,930,937 B2 * | 4/2011 | Roques | G01F 23/22 |
| | | | 73/295 |
| 8,052,846 B2 * | 11/2011 | Holmberg | C02F 1/048 |
| | | | 203/1 |
| 8,759,721 B1 | 6/2014 | Alexander | |
| 9,035,222 B2 | 5/2015 | Alexander | |
| 9,782,036 B2 | 10/2017 | Alexander | |
| 10,060,650 B2 * | 8/2018 | Gaspard | F24H 1/201 |
| 10,098,498 B2 | 10/2018 | Alexander | |
| 10,119,724 B2 * | 11/2018 | Jönsson | F28D 20/0039 |
| 10,222,091 B2 * | 3/2019 | Hankins | F24H 9/1818 |
| 10,244,892 B2 | 4/2019 | Alexander et al. | |
| 10,413,119 B2 | 9/2019 | Alexander | |
| 10,433,672 B2 | 10/2019 | Alexander et al. | |
| 10,442,406 B2 * | 10/2019 | Sato | F24H 1/009 |
| 10,451,292 B2 * | 10/2019 | De Los Toyos Lopez | |
| | | | F24C 15/102 |
| 10,545,108 B2 * | 1/2020 | Samarao | H01L 21/02565 |
| 10,561,262 B2 | 2/2020 | Phan et al. | |
| 10,674,865 B2 * | 6/2020 | Gamberini | A47J 31/545 |
| 10,989,421 B2 * | 4/2021 | Heil | G05B 19/042 |
| 11,219,099 B2 * | 1/2022 | Eisner | B01F 35/2115 |
| 11,395,559 B2 | 7/2022 | Alexander et al. | |
| 11,517,145 B2 | 12/2022 | Alexander et al. | |
| 2004/0211766 A1 | 10/2004 | Iannucci | |
| 2006/0007781 A1 | 2/2006 | Martin | |
| 2006/0081599 A1 | 4/2006 | Anderson | |
| 2007/0221068 A1 | 9/2007 | Boussemart et al. | |
| 2012/0103562 A1 | 5/2012 | Alexander | |
| 2016/0074057 A1 | 3/2016 | Jezierski | |
| 2016/0243598 A1 | 8/2016 | Alexander | |
| 2016/0256839 A1 * | 9/2016 | Dickson, Jr. | B01F 35/55 |
| 2017/0042373 A1 | 2/2017 | Alexander | |
| 2017/0087524 A1 | 3/2017 | Deshpande | |
| 2017/0138647 A1 | 5/2017 | Zhang | |
| 2017/0340147 A1 | 11/2017 | Hambrock | |
| 2018/0255966 A1 | 9/2018 | Moore | |
| 2018/0279832 A1 * | 10/2018 | Ohta | A47J 43/0465 |
| 2019/0298615 A1 | 10/2019 | Wood | |

FOREIGN PATENT DOCUMENTS

| | | |
|---|---|---|
| CN | 105700573 | 6/2016 |
| WO | 2017118379 | 7/2017 |

OTHER PUBLICATIONS

ISA 206—Invitation to Pay Additional Fees for Application No. PCT/US18/42977; dated Sep. 7, 2018, 2 pages.

Non Final Office Action for U.S. Appl. No. 16/040,523; dated Feb. 19, 2020, 8 pages.

Office Action dated Apr. 21, 2021, U.S. Appl. No. 16/040,523, 13 pages.

Office Action dated Aug. 26, 2020, U.S. Appl. No. 16/040,523, 10 pages.

International Search Report and Written Opinion for Application No. PCT/US2018/042977; dated Nov. 15, 2018, 17 pages.

* cited by examiner

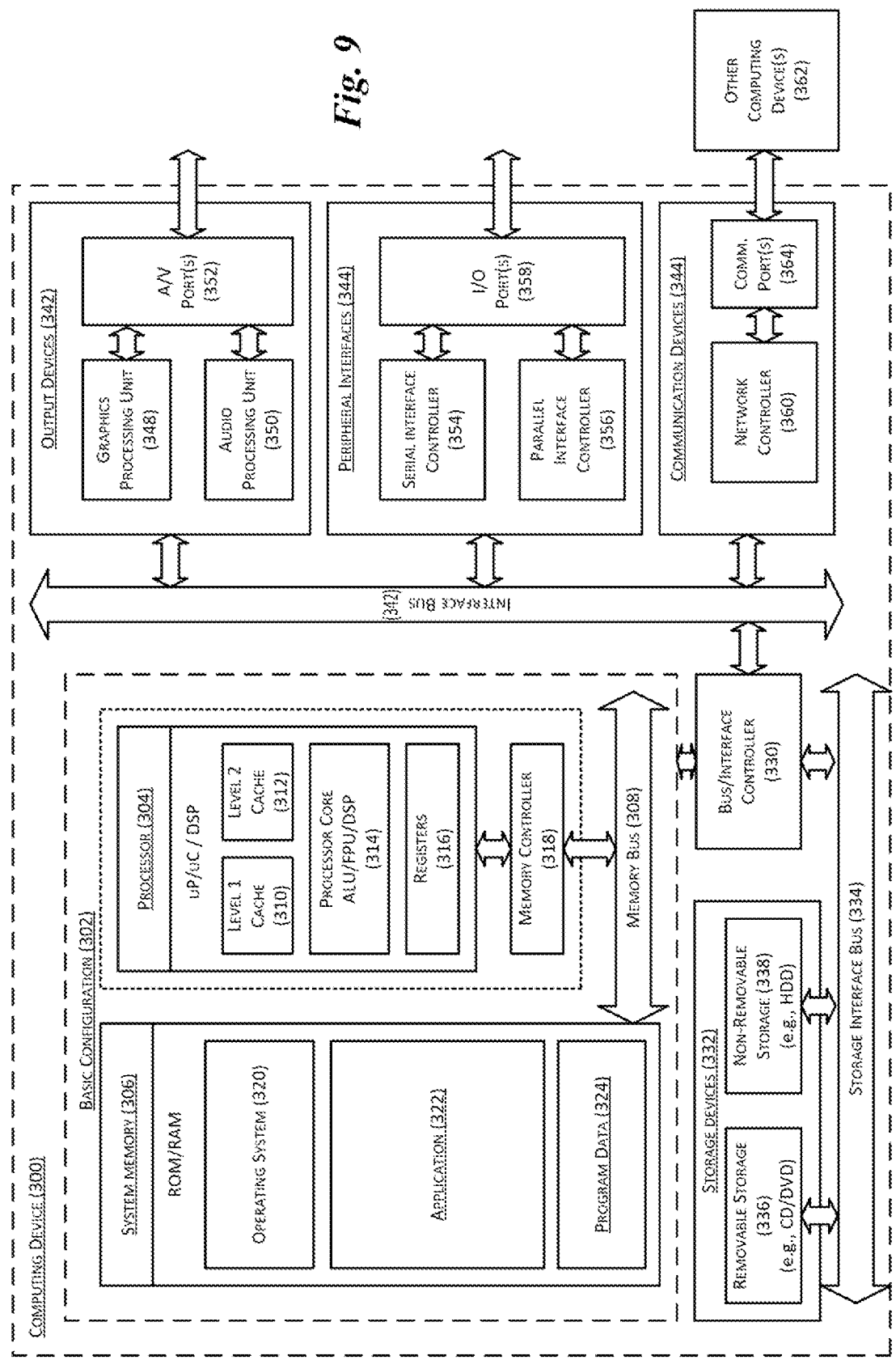

MULTIPLE PILLAR LIQUID HEATER

CROSS-REFERENCE TO RELATED APPLICATIONS

The present application is a Continuation of U.S. patent application Ser. No. 16/674,877, filed Nov. 5, 2019, which claims priority to and the benefit of U.S. Provisional Patent Application No. 62/755,795, entitled "PROPULSION HEATER," filed Nov. 5, 2018, and is a continuation-in-part of and claims priority to and the benefit of U.S. patent application Ser. No. 16/040,523, filed Jul. 19, 2018, entitled "LIQUID FOOD ITEM PRESERVATION AND PREPARATION," which claims priority to U.S. Provisional Patent Application No. 62/534,641, filed Jul. 19, 2017, entitled "APPARATUS FOR STORING AND HEATING A LIQUID," the disclosures of which are incorporated herein by reference in their entirety.

BACKGROUND

Some liquids need heating for their use but can become damaged or unusable if heated to high temperatures. For instance, pumped breastmilk is often heated prior to feeding, but can, if heated excessively, degrade in nutrient quality, be pasteurized of natural bacteria, and/or scald a feeding baby. A common heating practice includes submerging a breastmilk-filled bottle in a water-filled pot heated on the stove. Heating breastmilk in this way is time-consuming and can often be imprecise, causing dangerous or damaging hot spots to develop in the expressed breastmilk.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Several embodiments of the disclosed technology can quickly and efficiently heat a liquid, such as expressed breastmilk, to a target temperature without excessively heating the liquid. Several embodiments of the disclosed technology can evenly distribute heat throughout a liquid being heated during the heating process, thereby minimizing temperature gradients within the liquid and potential hotspots. Several embodiments of the disclosed technology can quickly and efficiently heat a liquid from an initial temperature to a target temperature. Several embodiments of the disclosed technology can be configured integrated within a suitable liquid holding vessel, such as an insulated bottle, food-safe cup or bottle, metal bottle, hot water kettle, hot water tank, or open top liquid container. U.S. patent application Ser. No. 16/040,523, filed Jul. 19, 2018, entitled "LIQUID FOOD ITEM PRESERVATION AND PREPARATION," which is incorporated herein by reference in its entirety and which the present application claims priority to and the benefit of, discloses a suitable liquid holding vessel comprising a liquid food item preparation device, in accordance with embodiments of the present disclosure.

Several embodiments of the disclosed technology comprise a propulsion heater comprising a base having a liquid-facing side, at least two heater pillars and a sensor pillar configured on the base and extending on the liquid-facing side away from the base, and a mixing component comprising a mixing element configured on the liquid-facing side of the base. Each of the at least two heater pillars can be configured to comprise a heating element configured to transfer heat to a liquid in a liquid-holding volume. In some embodiments, the heating elements comprise respective resistive wire coils. The sensor pillar can be configured to comprise at least one thermal sensor. The mixing element can be configured to comprise a stirrer. The mixing component can comprise a mixer motor configured to cause the mixing element to rotate. In some embodiments, the propulsion heater can be configured to comprise a volume sensor.

In some embodiments, the propulsion heater can be configured in a vessel comprising a liquid-holding volume. In some embodiments, the propulsion heater comprises a computing system that can be configured to apply power, via a power source, to the heating elements of the at least two heater pillars to cause the heater pillars to generate heat. The computing system can be further configured to apply power, via the power source, to the mixer motor to cause the mixing element to rotate. The computing system can be configured to receive thermal measurements from the at least one thermal sensor to determine a temperature of a liquid in the liquid-holding volume. The computing system can be configured to receive volume measurements from the volume sensor. In some embodiments, the propulsion heater can be configured to heat a liquid in the liquid-holding volume to a target temperature, and once the target temperature is reached, to cease heating the liquid.

Several embodiments of the disclosed technology may be integrated at any of various, suitable locations of a container. Several embodiments of the disclosed technology can be configured at a center bottom of a container. Several embodiments of the disclosed technology can be configured to transfer heat efficiently by maximizing surface area in contact with the liquid.

BRIEF DESCRIPTION OF THE DRAWINGS

FIG. 9 is a computing device suitable for certain components of the computing system in FIGS. 1-8.

DETAILED DESCRIPTION

Certain embodiments of apparatuses, systems, devices, and components (referred to generally herein as a "propulsion heater") for heating a liquid are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-9.

As used herein, the term "target temperature" generally refers to a temperature to which a liquid is to be heated. The target temperature for a liquid may comprise a temperature threshold.

Figure 1:
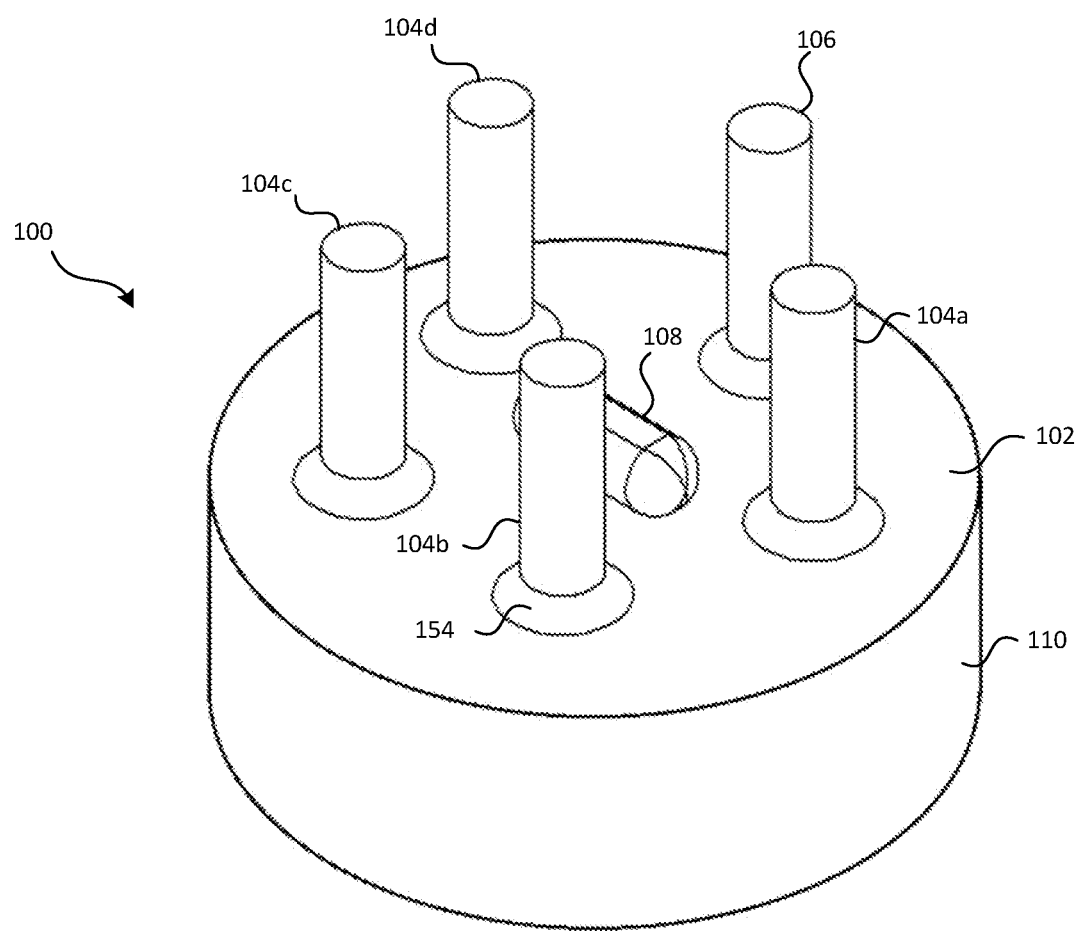
FIG. 1 is a perspective view of a propulsion heater in accordance with embodiments of the disclosed technology.
Figure 4A:
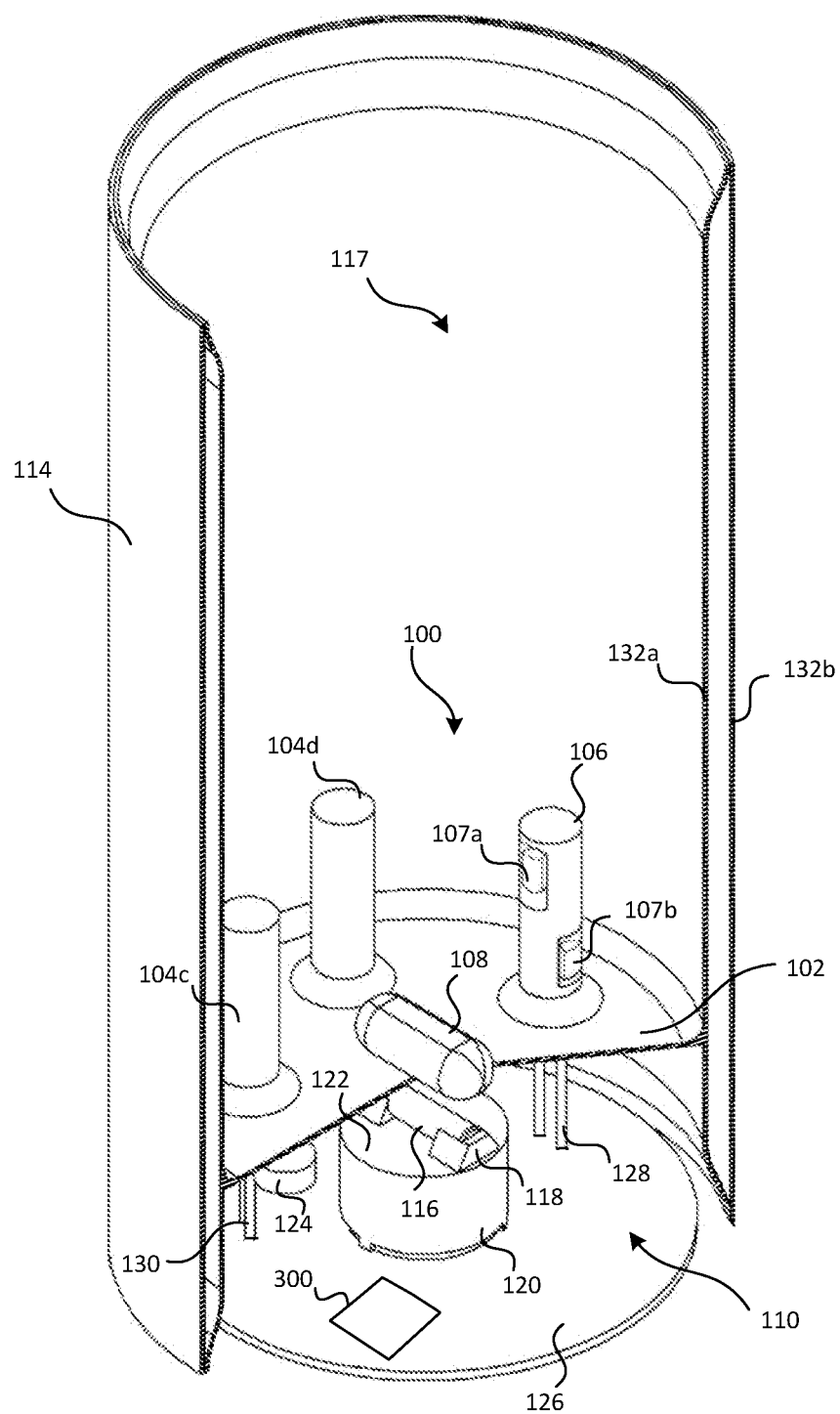
FIG. 4A is a schematic cutaway perspective view of a propulsion heater configured in a vessel showing internal components in accordance with embodiments of the disclosed technology.

FIG. 1 is a perspective view of a propulsion heater 100 configured in accordance with embodiments of the disclosed technology. FIG. 1 shows the propulsion heater 100 including a heater base 102, heater pillars 104a-d, a sensor pillar 106, a mixing element 108, and an electronics housing 110. In some embodiments, the propulsion heater 100 can be configured within a vessel, such as at a base of an internal volume of a bottle, as shown in FIG. 4A. In such an embodiment, the heater pillars 104a-d can be configured to transfer heat to a liquid in the internal volume, the sensor pillar 106 can be configured to detect a temperature of the liquid in the internal volume, and the mixing element 108 can be configured to agitate the liquid in the volume. As an example, U.S. patent application Ser. No. 16/040,523, filed Jul. 19, 2018, entitled "LIQUID FOOD ITEM PRESERVATION AND PREPARATION," which is incorporated herein by reference in its entirety and which the present application claims priority to and the benefit of, discloses a vessel comprising a container that can be configured to comprise the propulsion heater 100.

The propulsion heater 100 can be configured to transfer heat to a liquid via the heater pillars 104a-d. The heater pillars 104a-d can be configured to comprise respective heating elements. For example, each of the heater pillars 104a-d can be configured to comprise a resistive coil wire (not shown) configured to generate heat.

The sensor pillar 106 can be configured to detect a temperature. The sensor pillar 106 can be configured to comprise at least one thermal sensor (not shown) configured to detect a temperature. For example, the thermal sensor can comprise a thermometer.

The mixing element 108 can be configured to rotate. Rotation of the mixing element 108 can agitate a liquid in an internal volume of a vessel comprising the propulsion heater 100. For example, in some embodiments, the mixing element 108 can comprise a stirrer configured coupled to a mixer motor (not shown) that is configured to rotate the stirrer about an axis of rotation. As shown in FIG. 1, the mixing element 108 can comprise a stirrer having a pill shape. In some embodiments, the electronics housing 110 can be configured to include the mixer motor (not shown).

The sensor pillar 106 and heater pillars 104a-d can be configured to emanate from the heater base 102. In some embodiments, the sensor pillar 106 and heater pillars 104a-d are configured to be substantially orthogonal to the heater base 102. For example, as shown in FIG. 1, the sensor pillar 106 and heater pillars 104a-d can be configured to comprise cylinders originating at the heater base 102 and protruding away from the heater base 102. In some embodiments, the heater pillars 104a-d and the sensor pillar 106 can be configured to each comprise a pillar base 154 that slopes outward from the pillar and joins the heater base 102.

Figure 2:
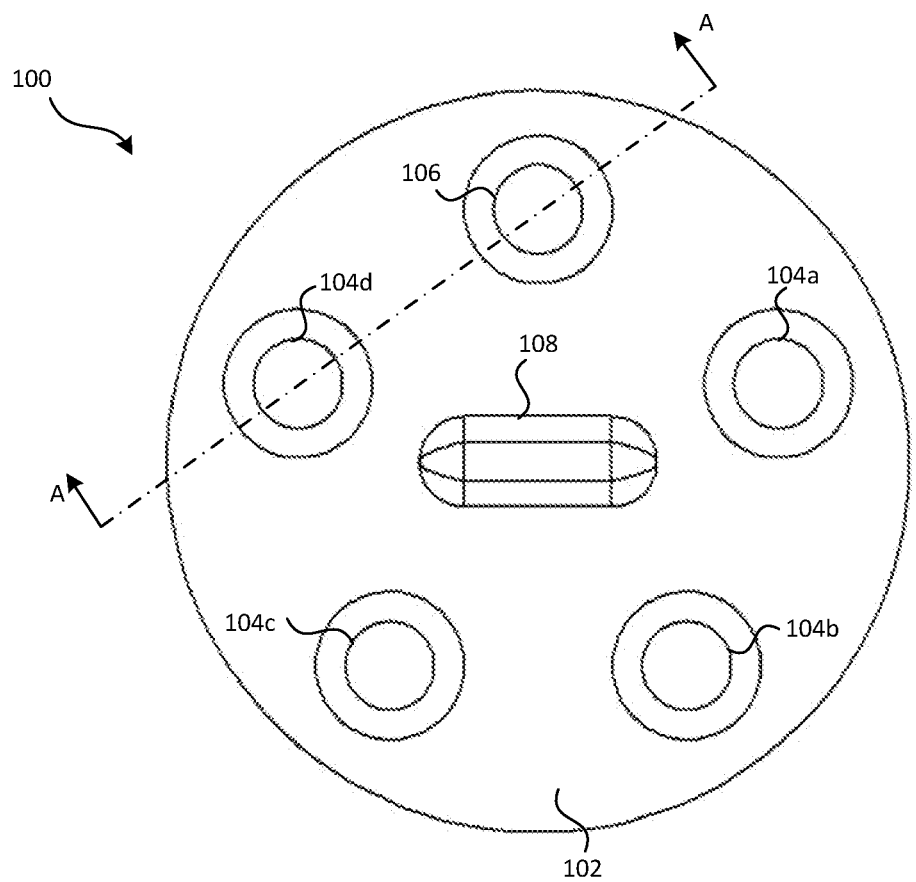
FIG. 2 is a top plan view of a propulsion heater in accordance with embodiments of the disclosed technology.

The sensor pillar 106 and heater pillars 104a-d can be configured in an arrangement that promotes even heating of a liquid in a liquid-holding volume. For example, FIG. 2 is a top plan view of the propulsion heater 100. As shown in FIG. 2, in some embodiments, the sensor pillar 106 and heater pillars 104a-d can be configured equidistant apart, forming corners of a pentagon arrangement, and the mixing element 108 can be configured to rotate about a center of rotation that is at a center of the pentagon arrangement. The sensor pillar 106 and heater pillars 104a-d can be configured at locations that do not obstruct the rotation of the mixing element 108.

In some embodiments, the sensor pillar 106 and heater pillars 104a-d can be configured in a different arrangement from the arrangement shown in FIGS. 1-2. For example, in some embodiments, the heating pillars 104a-d can be arranged in a square arrangement, and the sensor pillar 106 can be arranged between two of the heating pillars 104a-d. In other embodiments, the propulsion heater 100 can be configured to have more or fewer heater pillars than the four heater pillars 104a-d. For example, in some embodiments, the propulsion heater 100 can be configured to comprise five heater pillars and a sensor pillar, the heater pillars and the sensor pillar arranged in a hexagon arrangement.

Figure 3:
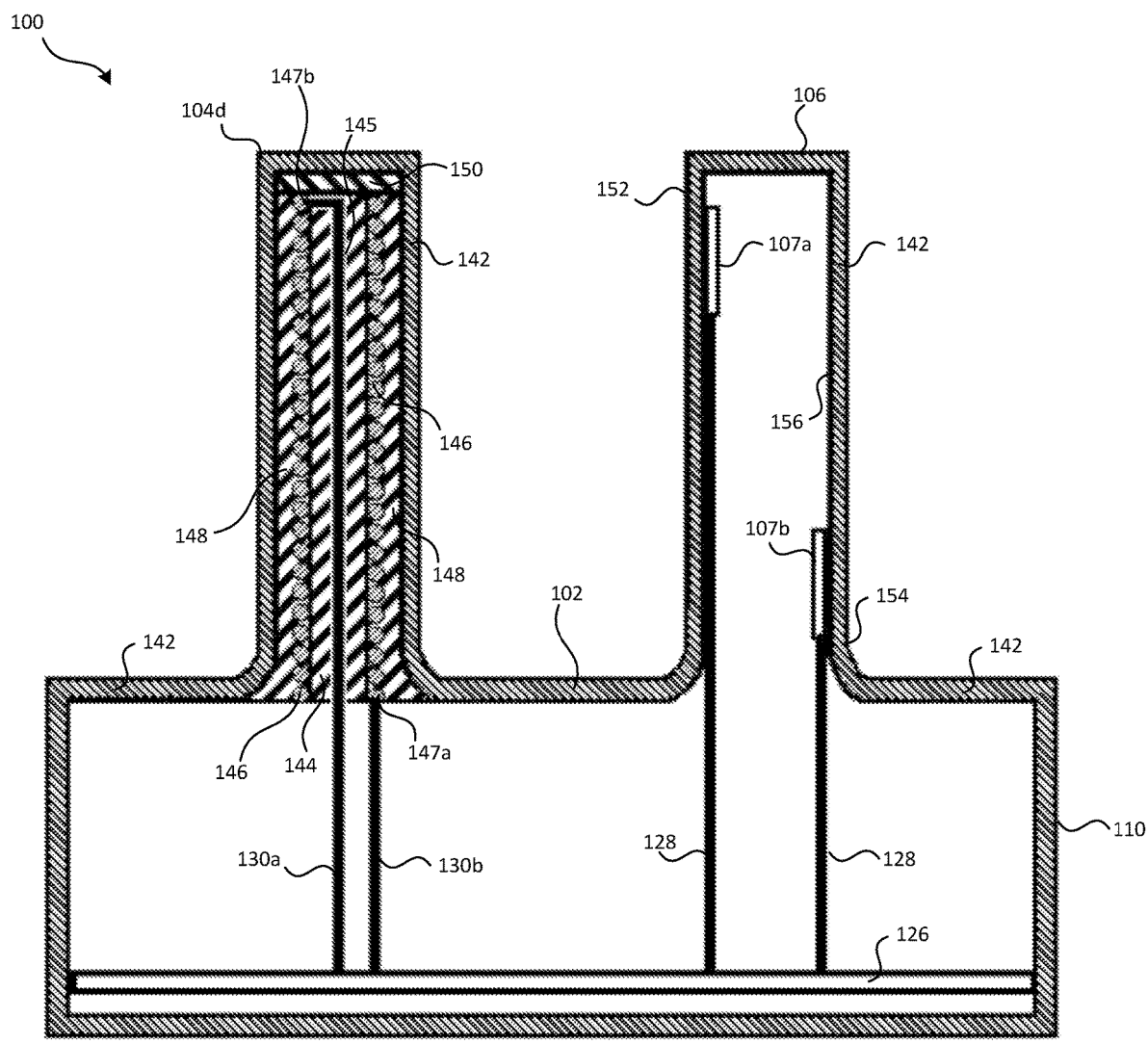
FIG. 3 is a schematic cross-sectional side view of a propulsion heater in accordance with embodiments of the disclosed technology.

FIG. 3 is a schematic cross-sectional side view of the propulsion heater 100 taken along the plane indicated by line A-A in FIG. 2. FIG. 3 shows the heater pillar 104d and the sensor pillar 106 emanating from the heater base 102. Heater pillars 104a-c can be constructed as discussed herein with respect to heater pillar 104d.

The heater pillar 104d, heater base 102, and sensor pillar 106 can be configured to comprise a surface material 142 configured to contact a liquid being heated by the propulsion heater 100. In some embodiments, as shown in FIG. 3, the surface material 142 can also comprise the electronics housing 110. In some embodiments, the surface material 142 can comprise a food-safe material. In some embodiments, the surface material 142 can comprise 304 stainless steel.

The surface material 142 can be manufactured to comprise the heater pillars 104a-d, heater base 102, sensor pillar 106, and electronics housing in various ways. In some embodiments, a single sheet of surface material 142 can be formed to comprise the heater pillars 104a-d, heater base 102, and sensor pillar 106. For example, in some embodiments, a sheet of stainless steel comprising the surface material 142 can be pressure formed to comprise the heater pillars 104a-d, heater base 102, and sensor pillar 106. In some embodiments, the surface material 142 comprising the heater pillars 104a-d, heater base 102, sensor pillar 106, and electronics housing 110 can be formed by joining two or more pieces of the surface material 142 together. For example, in some embodiments, the heater base 102, heater pillars 104a-d, sensor pillar 106, and electronics housing 110 can each be independently formed by stamping and joined together by welding into a single seamless form using such methods as laser welding, resistive welding, ultrasonic welding, or tungsten inert gas (TIG) welding.

The heater pillar 104d is configured to comprise a heating element. In some embodiments, as shown in FIG. 3, the heating element can comprise a resistive wire coil 146 wrapped around an electrically insulative core 144. For example, the resistive wire coil 146 can be configured to comprise a resistance heating metal, semi-meal, or alloy, such as nichrome. The resistive wire coil 146 can be configured to rapidly heat to a temperature proportional to a voltage applied across the resistive wire coil 146. In some embodiments, the electrically insulative core 144 can be configured to be thermally conductive. In some embodiments, the electrically insulative core 144 can be configured to comprise a magnesium oxide ceramic.

In some embodiments, the surface material 142 comprising the heater pillar 104d can be initially formed to comprise a hollow tube of the surface material 142. Subsequently, the heating element can be configured in the hollow tube of the surface material 142 comprising the heater pillar 104d. For example, the heating element comprising the resistive wire coil 146 wrapped around the electrically insulative core 144 can be inserted in the hollow tube of the surface material 142 comprising the heater pillar 104d. The resistive wire coil 146 can be electrically isolated from the surface material 142 by an electrically insulative thermal compound, such as magnesium oxide. For example, after inserting the resistive wire coil 146 wrapped around the electrically insulative core 144 into the hollow tube of the surface material 142 comprising the heater pillar 104d, an electrically insulative packing layer 148 comprising magnesium oxide powder can be packed between the wire coil 146 and the surface material 142. The electrically insulative packing layer 148 can be configured to permeate and fill physical gaps between coils of the resistive wire coil 146 and between the resistive wire coil 146 and surface material 142 comprising the heater pillar 104d. For example, a packing machine can be used to pack the magnesium oxide powder to form the insulative packing layer 148. In some embodiments, the electrically insulative packing layer 148 can be configured to transfer heat from the resistive wire coil 146 to the surface material 142, which can be configured to transfer the heat to a liquid being heated in liquid holding volume in which the propulsion heater 100 is disposed.

In some embodiments, as shown in FIG. 3, the heater pillar 104d can be configured to include a pillar cap 150. The pillar cap 150 can be configured between the electrically insulative core 144 and the surface material 142 of the heater pillar 104d. In some embodiments, as shown in FIG. 3, the pillar cap 150 can comprise an electrically isolating, thermally conductive material. For example, in some embodiments, the electrically isolating, thermally conductive material of the pillar cap 150 can comprise a ceramic, such as a magnesium oxide ceramic. In some embodiments, the electrically isolating, thermally conductive cap can be manufactured by packing the electrically isolating, thermally conductive material comprising the cap in the surface material 142 comprising the heater pillar 104d prior to introducing the resistive wire coil 146 and electrically insulative core 144 in the heater pillar 104d. In such embodiments, the pillar cap 150 can be configured to electrically isolate the resistive wire coil 146 from the surface material 142 of the heater pillar 104d. In such embodiments, as shown in FIG. 3, the electrically insulative core 144 can be configured comprising at least one hollow tunnel 145 along its length, from the pillar cap 150 through the heater base 102. A first lead 147a of the resistive wire coil 146 can be electrically coupled to the printed circuit board 126 and a power source (not shown) via heater connector 130b. A second lead 147b of the resistive wire coil 146 can be electrically connected to the printed circuit board 126 via heater connector 130a. As shown in FIG. 3, heater connector 130a can be routed through the hollow tunnel 145 of the electrically insulative core 144 for termination at the printed circuit board 126. The heater connectors 130a-b can comprise copper and can be crimped to the leads of the resistive wire coil 146.

In other embodiments, the pillar cap 150 can be configured to comprise a material that is electrically conductive, and the resistive wire coil 146 can be configured to be electrically coupled with the pillar cap 150. For example, the pillar cap 150 can be configured to ground the resistive wire coil 146 to the surface material 142 comprising the heater pillar 104d. In such embodiments, the pillar cap 150 can be configured to terminate the second lead 147b of the resistive wire coil 146. In such embodiments, the pillar cap 150 can be constructed of a metal, such as copper, or a semi-metal material, such as graphene.

The sensor pillar 106 is configured to comprise at least one thermal sensor 107a-b. As shown in FIG. 3, in some embodiments, the sensor pillar 106 can be configured to comprise at least a first thermal sensor 107a and a second thermal sensor 107b, the first thermal sensor 107a configured at a different height than the second thermal sensor 107b on the sensor pillar 106. For example, as shown in FIG. 3, the first thermal sensor 107a is configured at a top 152 of the sensor pillar 106 and the second thermal sensor 107b is configured near the pillar base 154 of the sensor pillar 106. Accordingly, the thermal sensors 107a-b can be configured to detect the temperature at two depths within a liquid being heated. In some embodiments, additional thermal sensors can be configured on the sensor pillar 106. In some embodiments, as shown in FIG. 3, thermal sensors 107a-b can be positioned 180 degrees from one another within the sensor pillar 106. In some embodiments, thermal sensors 107a-b can be positioned at varying degrees from one another within the sensor pillar 106.

The thermal sensors 107a-b can be configured on an internal side 156 of the surface layer 142 of the sensor pillar 106. The thermal sensors 107a-b can be adhered to the internal side 156 of the surface layer 142 of the sensor pillar 106 via a thermally conductive adhesive. The thermal sensors 107a-b can be configured electrically coupled via the sensor connectors (not shown) with the printed circuit board 126.

FIG. 4A shows a schematic perspective cutaway view of the propulsion heater 100 configured in a vessel 114. The vessel 114 is configured to include a liquid holding volume 117. The vessel 114 comprises an inner shell 132a and an outer shell 132b.

FIG. 4A shows the cutaway view of the vessel 114 and propulsion heater 100, including a cutaway of the inner shell 132a and outer shell 132b of the vessel 114, a wall of the electronics housing 110, and the heater base 102. Also shown cutaway are portions of the surface layer of the sensor pillar 106, showing the thermal sensors 107a-b. Not shown are heater pillars 104a-b, shown in FIGS. 1 and 2, which are configured at the cut portion of the heater base 102. In some embodiments, the electronics housing 110 can be defined, at least in part, by at least the inner shell 132a of the vessel 114. FIG. 4A shows an internal volume of the electronics housing 110. The view shown in FIG. 4A shows the heater pillars 104c-d and the sensor pillar 106 configured emanating from the heater base 102 in the liquid holding volume 117. FIG. 4A also shows the mixing element 108 configured on the heater base 102 in the liquid holding volume 117.

As shown in FIG. 4A, the electronics housing 110 can be configured to comprise a mixer motor 120, a volume sensor 124, and the printed circuit board 126, among other components. In some embodiments, as shown in FIG. 4A, the printed circuit board 126 comprises a computing system 300 comprising a processor and memory. The electronics housing 110 can be configured to comprise heater connectors 130, that electrically connect the respective heating elements of heater pillars 104a-d and the printed circuit board 126, which is electrically coupled with a power source (not shown). The computing system 300 can be configured to control power being supplied to the heater pillars 104a-d via the heater connectors 130. The electronics housing 110 can also comprise sensor connectors 128 configured to electrically couple the thermal sensors 107a-b and the printed circuit board 126. For example, in some implementations, the sensor connectors 128 can be configured to communicate thermal measurements sensed by the thermal sensors 107a-b to the computing system 300 of the printed circuit board 126.

The mixer motor 120 is configured to exert a force on the mixing element 108 to cause the mixing element 108 to rotate. The mixing element 108 can be configured to comprise a magnet. For example, in some embodiments, the mixing element 108 comprises a neodymium magnet. The mixer motor 120 can be configured to comprise a motor magnet 116 that is magnetically coupled to the mixing element 108. The mixer motor 120 can be configured to force the motor magnet 116 to rotate, and the rotation of the motor magnet 116 can cause the mixing element 108 to rotate as well.

In some embodiments, the mixer motor 120 can be configured to comprise a rotating top 122. The rotating top 122 of the mixer motor 120 can be configured to comprise the motor magnet 116. The motor magnet can be configured attached to the rotating top 122 of the mixer motor 120. In some embodiments, the motor magnet 116 can be adhered to the rotating top 122 of the mixer motor 120. For example, as shown in FIG. 3, the motor magnet 116 can be attached to the rotating top 122 via magnet attachments 118. The magnet attachments 118 can comprise, for example, plastic clips.

The mixer motor 120 can be configured to force the rotating top 122 to rotate. For example, in some embodiments, the mixer motor 120 can comprise a Brushless DC electric motor or a Ball Bearing DC electric motor. The mixer motor 120 can be configured to be electrically coupled to the computing system 300 of the printed circuit board 126. The computing system 300 can be configured to control the mixer motor 120 and power the mixer motor 120 using the power supply (not shown).

The volume sensor 124 can be configured within the electronics housing 110 to a housing side (not shown) of the heater base 102. The volume sensor 124 can be configured to capture measurements that can be used for calculating a volume of a liquid in the liquid holding volume 117. The electronics housing 110 can comprise volume sensor connectors (not shown) that can be electrically coupled with the computing system 300 of the printed circuit board 126. In some embodiments, the volume sensor 124 can comprise an ultrasonic liquid volume sensor.

Figure 4B:
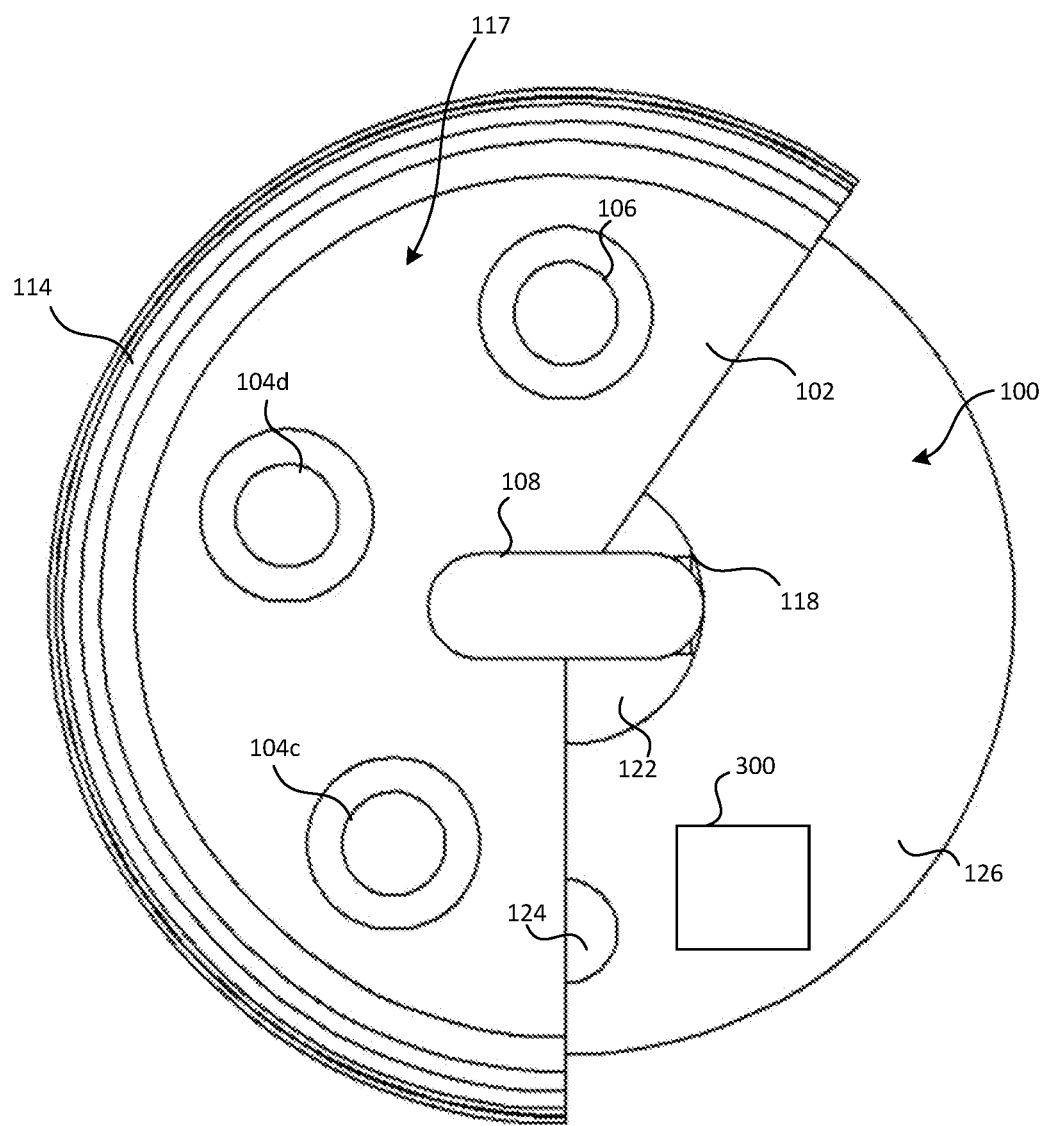
FIG. 4B is a schematic cutaway top plan view of a propulsion heater configured in a vessel in accordance with embodiments of the disclosed technology.

FIG. 4B shows a schematic top cutaway plan view of the vessel 114 comprising the propulsion heater 100, showing the heater base 102 and the vessel 114 cut, as shown in FIG. 3A. FIG. 3B shows the sensor pillar 106 and heater pillars 104c-d, and heater pillars 104a-b are cutaway. FIG. 3B also shows the printed circuit board 126 and the volume sensor 124.

FIG. 4B also shows the mixing element 108, which is configured on the heater base 102 within the liquid holding volume 117 of the vessel 114. The mixing element 108 is configured in a vertical plane with the motor magnet (not shown). FIG. 4B shows the rotating top 122 of the mixer motor 120. FIG. 4B also shows the magnet attachments 118, which can be configured to attach the motor magnet (not shown) and the rotating top 122 of the mixer motor. FIG. 4B also shows the computing system 300.

Figure 5:
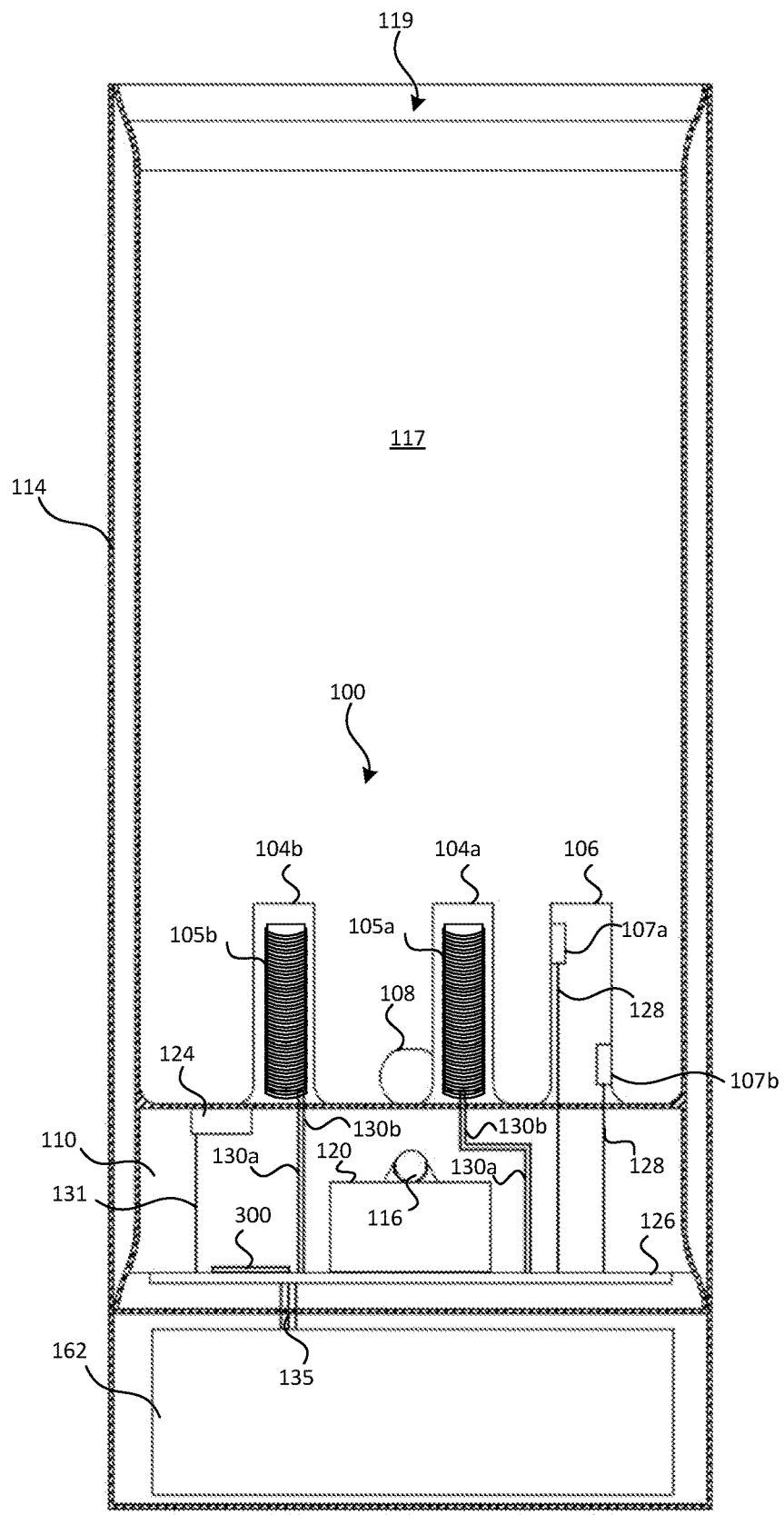
FIG. 5 is a schematic cutaway side plan view of a propulsion heater configured for heating a liquid in a vessel in accordance with embodiments of the disclosed technology.

FIG. 5 shows a schematic cutaway side plan view of the propulsion heater 100 configured in the vessel 114, including a power source comprising a battery pack 162. In some embodiments, the battery pack 162 can comprise a battery and battery controller. The battery pack 162 can be configured to power the computing system 300, the heater pillars 104a-d, and mixer motor 120, among other components. A liquid, such as human breast milk, can be added to the liquid holding volume 117 via an orifice 119 of the liquid holding volume 117. The liquid can be heated by the propulsion heater 100 and agitated by the mixing element 108.

FIG. 5 shows the heater pillars 104a-b and the sensor pillar 106. The heater pillars 104c-d are blocked from view in FIG. 5 by heater pillars 104a-b. As shown in FIG. 5, heater pillar 104a comprises a heating element 105a and heater pillar 104b comprises a heating element 105b. Although not shown, heater pillars 104c-d include similar heating elements as heating elements 105a-b. FIG. 5 also shows the mixing element 108, motor magnet 116, volume sensor 124, and printed circuit board 126. The printed circuit board 126 can be configured electrically connected with the volume sensor 124 via volume sensor connector 131, the heating elements 105a-b of the heater pillars 104a-b via heater connectors 130a-b, and the thermal sensors 107a-b via sensor connectors 128. The printed circuit board 126 can further be electrically connected with the mixer motor 120 and the computing system 300, and with the battery pack 162 via battery connectors 135. The printed circuit board 126 can be configured mounted within the electronics housing 110.

The computing system 300 can be configured to control, modulate, and/or regulate power to the respective heating elements of the heater pillars 104a-d. In some embodiments, the computing system 300 can be configured to receive input from thermal sensors 107a-b and volume sensor 124. In some embodiments, the computing system 300 can be configured to detect and/or receive input related to the heating elements 105a-b of the heater pillars 104a-b. For example, in some embodiments, the computing system 300 can detect a current drawn by the heating elements 105a-b of the heater pillars 104a-b. In some embodiments, the computing system 300 can be configured to supply power selectively to fewer than all the heating elements of the heating pillars 104a-d. For example, in some embodiments, the computing system 300 can be configured to supply power selectively to the heating element 105b of heating pillar 104b and not the heating element 105a of heating pillar 104a, or the heating elements of heater pillars 104c and 104d.

In some embodiments, the propulsion heater 100 and/or the vessel 114 can comprise an input mechanism (not shown) electrically coupled to the computing system 300, the input mechanism configured for receiving input from a user. In some embodiments, the input mechanism can comprise a button, a touchscreen display, a switch, or the like. In some embodiments, the computing system 300 can be configured to modulate power to the heating elements of the heater pillars 104a-d (including heating elements 105a-b) based at least in part on thermal and/or volume sensor input. In some embodiments, the computing system 300 can be configured to modulate power to the heating elements of the heater pillars 104a-d (including heating elements 105a-b) based at least in part on input from at least one heating element of the heater pillars 104a-d. In some embodiments, the computing system 300 can be configured to modulate, turn-on, or shut-off power to the heating elements of the heater pillars 104a-d (including heating elements 105a-b) based at least in part on user input, such as input from a button, a touchscreen, a switch, or the like.

In some embodiments, the propulsion heater 100 or the vessel 114 can be configured to include a display, such as an LED indicator, an LED array, an LCD display, an OLED display, or the like. In some embodiments, the computing system 300 can be configured to output device and component information to a display.

In some embodiments, the heating elements of the heater pillars 104a-d (including heating elements 105a-b) can be controlled by an environmental switch, such as a temperature switch or liquid volume switch. For example, the propulsion heater 100 can be configured to switch the heating elements 105a-b off in response to receiving input from the thermal sensors 107a-b indicating that a target temperature has been measured. In some embodiments, the heating elements of the heater pillars 104a-d (including heating elements 105a-b) can operate at a static duty cycle. In some embodiments, the heating elements of the heater pillars 104a-d (including heating elements 105a-b) can be configured to operate at a calculated, dynamic duty cycle. In some embodiments, the heating elements of the heater pillars 104a-d (including heating elements 105a-b) can be controlled by a user, based at least in part on receiving input from the user, such as detecting a press of a button configured on the propulsion heater 100 or vessel 114. In some embodiments, the heating elements of the heater pillars 104a-d (including heating elements 105a-b) can be controlled by an external controller. For example, in some embodiments, the external controller can comprise the computing system 300 configured external to the propulsion heater 100 and vessel 114.

In some embodiments, the propulsion heater 100 can be configured to calculate and apply a voltage across the heating elements (including heating elements 105a-b) of the heating pillars 104a-d based at least in part on input received from the thermal sensors 107a-b and/or the volume sensor 124. In some embodiments, the propulsion heater 100 can be configured to calculate and apply a power to the mixing motor 120 based at least in part on input received from the thermal sensors 107a-b and/or the volume sensor 124. In some embodiments, the propulsion heater 100 can be configured as a permanent fixture in a container, such as a double-layer vacuum insulated container. In some embodiments, the propulsion heater 100 can be configured as a removable fixture in a container, such as a hot water kettle. In some embodiments, the propulsion heater 100 can be configured to comprise a display for displaying a user interface and a button for receiving user input. In such an embodiment, the propulsion heater 100 can be configured to receive user input comprising an instruction to heat a liquid in a liquid-holding volume, in response to receiving the instruction, heat the liquid in the liquid holding volume to a target temperature. In some embodiments, the propulsion heater 100 can be configured such that power to the heating elements (including heating elements 105a-b) of heater pillars 104a-d and power to the mixing motor 120 is controlled and calculated by an external controller and power supply using, at least in part, measurements received from the thermal sensors 107a-b and/or the volume sensor 124.

A benefit of the disclosed apparatus includes quickly heating a liquid to a target temperature while minimizing hot-spots, thermal gradients, and excessive temperatures in the liquid. In some embodiments, the computing system 300 of the propulsion heater 100 can be configured to power the mixing motor 120 such that the mixing element 108 revolves at a determined revolutions per minute (RPM). In some embodiments, an RPM for the mixing element 108 can be determined based at least in part on the temperature measurements received from the thermal sensors 107a-b of the sensor pillar 106 and/or volume measurements received from the volume sensor 124. In some embodiments, an RPM of the mixing element 108 can be determined based at least in part on a type of liquid in the liquid holding volume 117.

In some embodiments, the computing system 300 can be configured to modulate power to the mixing motor 120 based at least in part on input from the thermal sensors 107a-b and/or the volume sensor 124. In some embodiments, the computing system 300 can be configured to modulate power to the mixing motor 120 based at least in part on the current drawn by the mixing motor 120. In some embodiments, the computing system 300 can be configured to modulate, turn-on, or shut-off power to the mixing motor 120 based at least in part on user input received via, for example, a button, a touchscreen, a switch, or the like.

In some embodiments, the mixing motor 120 can be controlled by an environmental switch, such as a temperature switch or liquid volume switch. In some embodiments, the mixing motor 120 can be configured to operate at a static duty cycle. In some embodiments, the mixing motor 120 can be configured to operate at a calculated, dynamic duty cycle. In some embodiments, the mixing motor 120 can be configured to be controlled by the user based on user input, received, for example, via a button press or via a touchscreen. In some embodiments, the mixing element 108 can comprise a magnet coated in a food-safe material, such as borosilicate glass or Teflon. In some embodiments, the mixing motor 120 can be anchored to the printed circuit board 126 via a component chassis. In some embodiments, the mixing motor 120 can be directly anchored to the printed circuit board 126 via, for example, one or more screw/screw-post or screw/nut combination. The mixing element 108 can be configured to rotate and cause liquid in the liquid holding volume 117 to circulate between the heater pillars 104a-d and the sensor pillar 106. In some embodiments, as the mixing element 108 spins within the liquid holding volume 117, it can cause a liquid in the liquid holding volume 117 to mix.

The thermal sensors 107a-b of the sensor pillar 106 can be configured to transmit digital data corresponding to or representing temperature values to the computing system 300. In some embodiments, the thermal sensors 107a-b can be configured to transmit analog data, such as voltage and resistivity corresponding to temperature values to the computing system 300. In some embodiments, the thermal sensors 107a-b can be configured to transmit real-time temperature data to the computing system 300. In some embodiments, the thermal sensors 107a-b can be configured to send sensed liquid temperature data at preset intervals. In some embodiments, the thermal sensors 107a-b can be configured to send an interrupt signal to computer system 300 when a predetermined liquid temperature in the liquid holding volume 117 is sensed. In some embodiments, the thermal sensors 107a-b can be configured as a binary temperature switch whose value, which may be digital or analog data, only changes when a predetermined liquid temperature is sensed.

In some embodiments, the volume sensor 124 can be configured to send real-time volume data to the computing system 300. In some embodiments, the volume sensor 124 can comprise an ultrasonic fluid level sensor. In some embodiments, the volume sensor 124 can comprise a resistive fluid level sensor. In some embodiments, the volume sensor 124 can comprise an infrared fluid level sensor. In some embodiments, the volume sensor 124 can comprise a capacitive fluid level sensor. In some embodiments, the volume sensor 124 can be configured to transmit digital data corresponding to or representing volume values in the liquid holding volume 117 to the computing system 300. In some embodiments, the volume sensor 124 can be configured to send analog data, such as voltage and resistivity corresponding to liquid volume values in the liquid holding volume 117 to the computing system 300. In some embodiments, the volume sensor 124 can be configured to send sensed liquid volume data at preset intervals. In some embodiments, the volume sensor 124 can be configured to signal an interrupt to the computing system 300 when a predetermined liquid volume is sensed. In some embodiments, the volume sensor 124 can be configured as a binary switch whose value, which may be digital or analog data, only changes when a predetermined volume is sensed.

In some embodiments, the computing system 300 can be configured to modulate power from the power source to the mixing motor 120, and thus control the velocity of rotation of the mixing element 108, based on inputs from the thermal sensors 107a-b and volume sensor 124.

In some embodiments, the computing system 300 can be configured to activate or deactivate the mixer motor 120 to a preset velocity based at least in part on inputs from the thermal sensors 107a-b. In some embodiments, the computing system 300 can be configured to either activate or deactivate the mixing motor 120 based at least in part on inputs from the thermal sensors 107a-b and volume sensor 124.

In some embodiments, the mixing motor 120 may be controlled by temperature sensors 107a-b. In some embodiments, the mixing motor 120 can operate at a static velocity. In some embodiments, the mixing motor 120 can be configured to operate at a variable velocity.

In some embodiments, the propulsion heater 100 can be configured to operate from a persistent power source, such as an AC to DC power supply. In some embodiments, the propulsion heater 100 can be configured to operate from a finite power source, such as a battery.

In some embodiments, the propulsion heater 100 can be configured to be controlled by an external controller. In some embodiments, the propulsion heater 100 can be configured to receive power supplied vis-à-vis an external controller. In some embodiments of the propulsion heater 100, an external controller can be configured to deliver power to the components of a specific propulsion heater 100, separately and independently (e.g., power the heater pillars but not the motor). In some embodiments of the propulsion heater 100, an external controller mechanism can accept data input from at least one propulsion heater 100.

In some embodiments, an external controller may control the heating elements of heater pillars 104a-d of a specific propulsion heater of an array of propulsion heaters given dynamic input data from that propulsion heater including, for example, temperature data, volume data, and power consumption data. In some embodiments, an external controller may control the mixing device 120 of a specific propulsion heater of an array of propulsion heaters given dynamic input data from that propulsion heater including, for example, temperature data, volume data, and power consumption data.

In some embodiments, an external controller may itself send, switch, and modulate power to a specific component, such as a heating element or mixing motor within a specific propulsion heater of an array of propulsion heaters. In some embodiments, an external controller may remotely modulate the power switching circuit for a specific component, such as a heating element or mixing motor within a specific propulsion heater.

The propulsion heater can be configured for portability and ease of use with different vessel configurations. At times, a user may wish to suspend the propulsion heater from a top of a liquid-holding vessel when the bottom of the liquid-holding vessel is inaccessible, uneven, or obstructed. For such cases, the propulsion heater can be configured so that is can suspend itself from the top opening of a liquid-holding vessel with its heating pillars, sensors, and mixer device immersed in the liquid.

Figure 6:
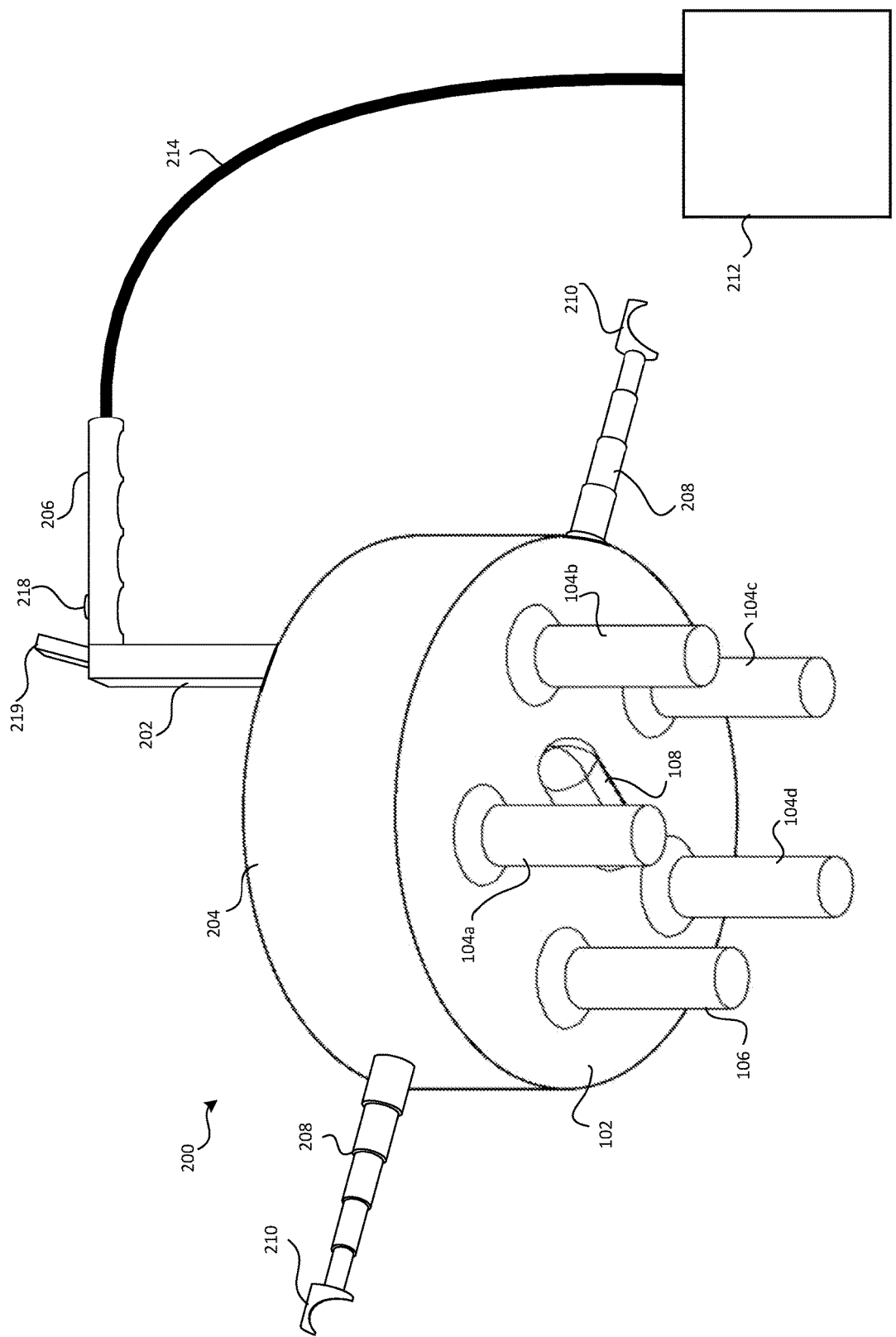
FIG. 6 is a schematic perspective view of a suspended propulsion heater configured for heating a liquid in a liquid-holding volume of a vessel in accordance with embodiments of the disclosed technology.

FIG. 6 shows a schematic perspective view of a suspended propulsion heater 200 configured for being suspended at a top opening of a vessel, according to some implementations. In some embodiments, the suspended propulsion heater 200 can be configured with at least one insulated arm 202 that stands erect and perpendicular to an electronics housing 204. The electronics housing 204 can be configured as a waterproof housing for suspended propulsion heater electronic components and interfaces, such as printed circuit board (not shown), computing system (not shown), mixer motor (not shown), volume sensor (not shown), motor magnet (not shown), magnet attachment (not shown), connectors (not shown), other electronics (not shown), and a battery (not shown). The insulated arm 202 can be further configured with a perpendicularly attached insulated handle 206 at the end opposite the electronics housing, which a user can hold to position, reposition, and place the suspended propulsion heater 200. The insulated handle 206, insulated arm 202, and electronics housing 204 can also be configured as a channel for routing power wiring 214 from an external power source 212, such as a DC power supply. The insulated handle 206 can comprise a button 218 which can be engaged by a user to commence heating by the suspended propulsion heater 200. In some embodiments, the insulated handle 206 can comprise a display 219.

In some embodiments, the suspended propulsion heater can also be configured with at least two adjustable, telescoping support beams 208. In some embodiments, the telescoping support beams 208 are positioned at equal distances and angles relative to one another (e.g. zero and 180 degrees). In some embodiments, the telescoping support beams 208 extend outwards from a center origin of the electronics housing 204. In some embodiments, the support beams 208 can comprise telescoping sections that can extend end-to-end or collapse into one another for stowage inside or against the suspended propulsion heater 200 electronics housing 204. In some embodiments, the support beams can comprise concave hooks 210 at the end farthest from the electronics housing 204. In some embodiments, the telescoping support beams 208 and hooks 210 can be configured to extend from the electronics housing 204 and align with the lip or rim of the liquid vessel. In some embodiments, the telescoping support beam hooks 210 can be configured to hook onto the lip of rim of the liquid-holding vessel, thus suspending the propulsion heater at or above the water line of the liquid-holding vessel. In some embodiments, the telescoping support beams 208 can be configured with pivoting joints at the base where a beam meets the electronics housing 204 allowing a support beam 208 to pivot up or down relative to the suspended propulsion heater 200. In some embodiments, the telescoping support beams 208 allow the propulsion heater to be suspended from an opening of a liquid-holding vessel such that, for example, the sensor pillar 106, heater pillars 104a-d, heater base 102, and mixing element 108 are immersed in the liquid content of a liquid-holding vessel while the electronics housing 204 can remain partially submerged or completely above the liquid in the liquid vessel.

Figure 7:
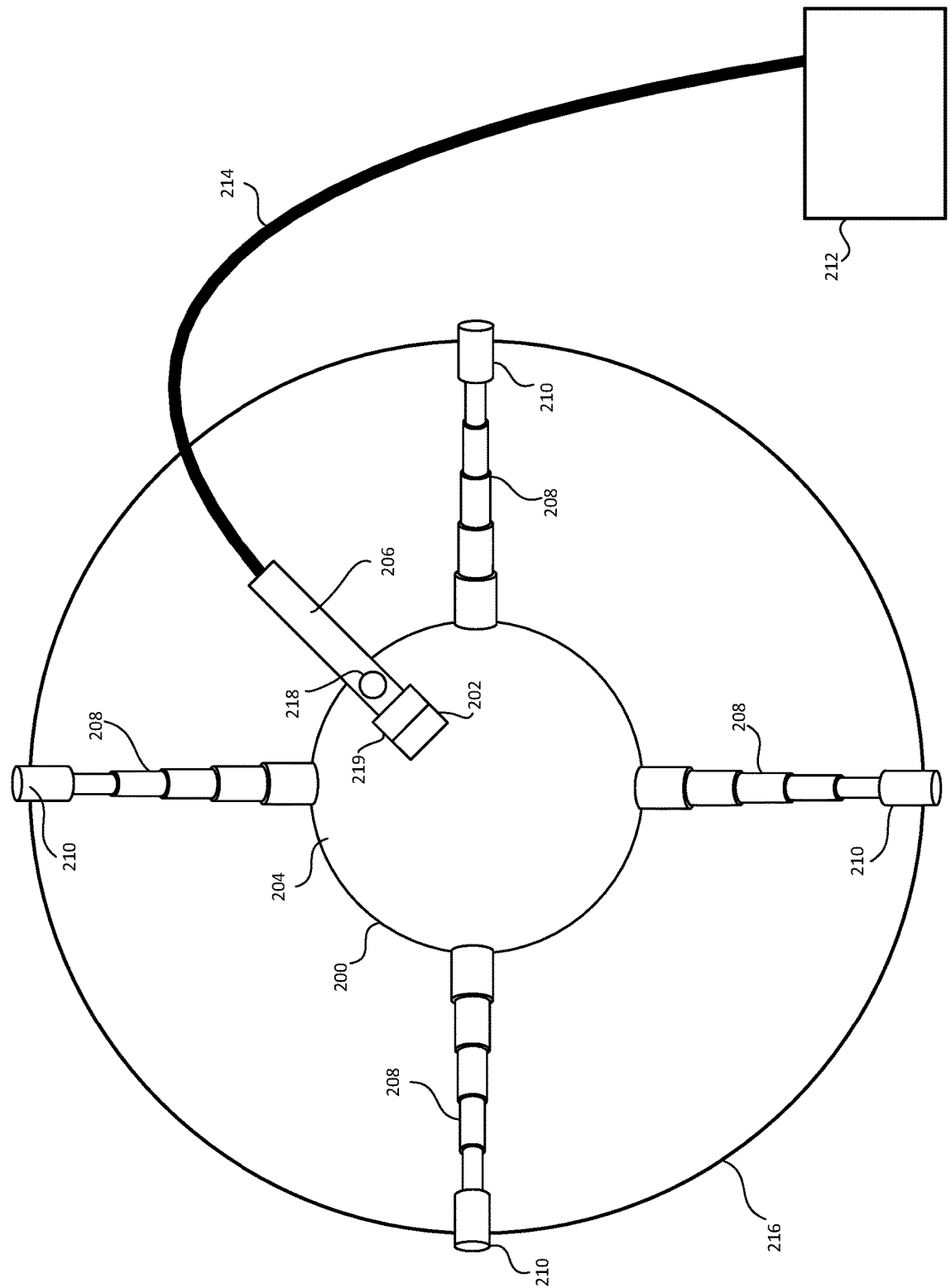
FIG. 7 is a schematic top plan view of a suspended propulsion heater configured on a vessel for heating a liquid in a liquid-holding volume of the vessel in accordance with embodiments of the disclosed technology.

FIG. 7 shows a schematic top plan view of the suspended propulsion heater 200 configured on a vessel 216. FIG. 7 shows the suspended propulsion heater 200 comprising four telescoping support beams 208 and hooks 210, the hooks 210 attached around a rim of a top of the vessel 216.

Figure 8:
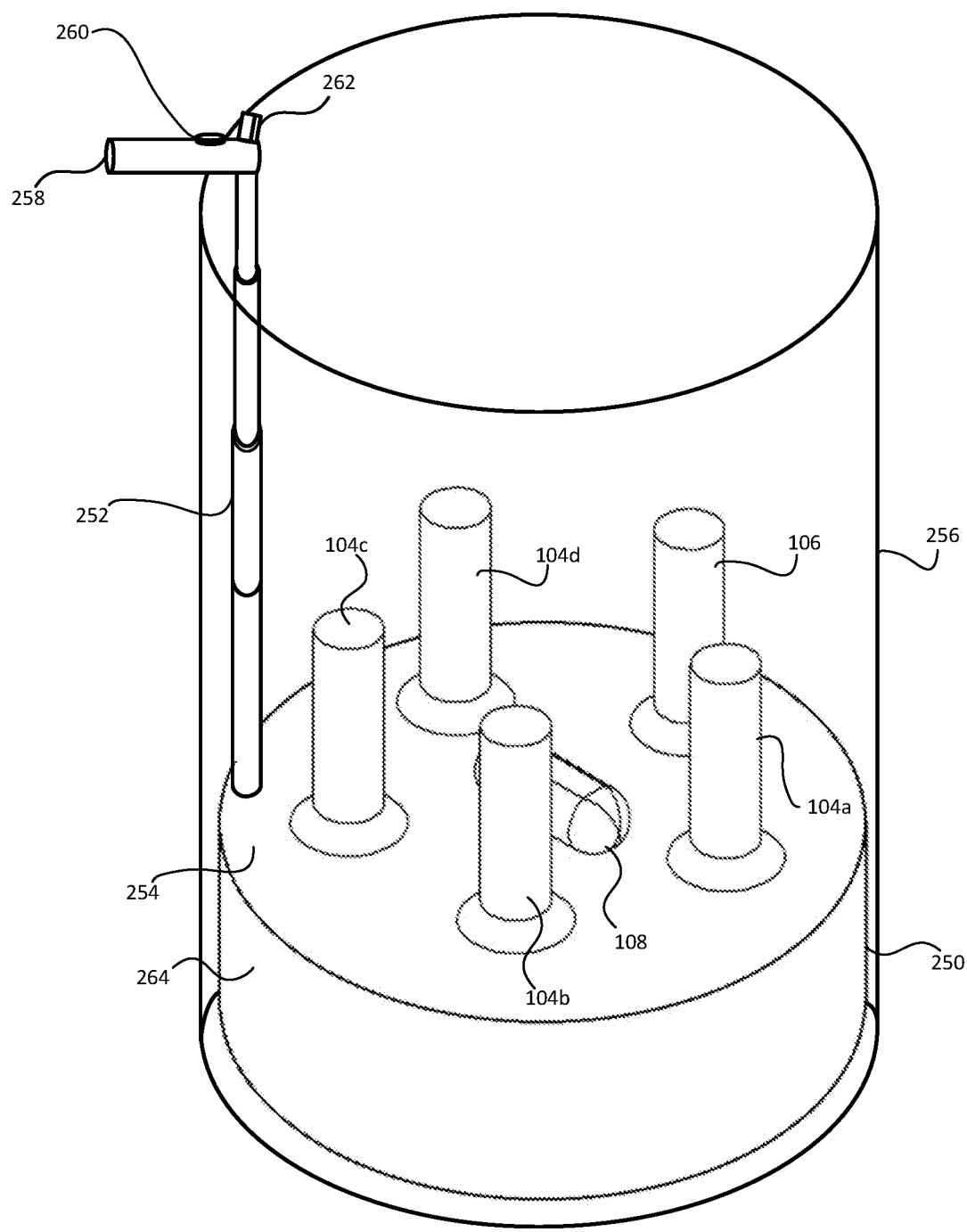
FIG. 8 is a schematic perspective view of a submergible propulsion heater in accordance with embodiments of the disclosed technology.

FIG. 8 shows a schematic perspective view of a submergible propulsion heater 250 configured to be portable and submergible in a liquid for heating the liquid.

The submergible propulsion heater 250 can be configured with at least one telescoping insulated arm 252 that can stand erect from and perpendicular to a heater base 254. The telescoping insulated arm 252 can simplify placement of the submergible propulsion heater 250 in a submerged position within a liquid of a liquid holding volume of a vessel 256 by a user. In some embodiments, the telescoping insulated arm 252 can be configured to comprise a perpendicularly attached insulated handle 258. By handling the submergible propulsion heater 250 with the insulated handle 258, a user can more easily and accurately extend the telescoping insulated arm 252 and position, reposition, and place the submergible propulsion heater 250 at a desired submerged position in a liquid of a liquid holding volume of the vessel 256. In some embodiments, as shown in FIG. 8, the insulated handle 258 can be configured to include a button 260 and a status display 262. In some embodiments, the handle 258, telescoping insulated arm 252, and an electronics housing 264 can also be configured with a hollow, waterproof routing tunnel (not shown) through which power wiring (not shown) from an external power source (not shown), such as a DC power supply, can be routed into the submergible propulsion heater 250. The submergible propulsion heater 250 can be configured to comprise the mixing element 108, the sensor pillar 106, the heater pillars 104a-d, the mixer motor (not shown), and the volume sensor (not shown), among other components.

FIG. 9 is the computing device 300 suitable for certain components of the propulsion heater in FIGS. 1-8. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims. Furthermore, even if not labeled as such, Figures may not be drawn to scale.

I claim:

1. A heating apparatus comprising:
a base;
at least two heater pillars extending from the base to a pillar height,
   wherein the at least two heater pillars each comprise a heating element;
a thermal sensor; and
a mixer component, the mixer component comprising a mixing element disposed on the base between the base and the pillar height.

2. The apparatus of claim 1, wherein the heating element of each of the at least two heater pillars comprises a resistive wire coil.

3. The apparatus of claim 2, wherein the resistive wire coil is encased in an electrically insulative, thermally conductive compound.

4. The apparatus of claim 1, wherein:
the base comprises a top surface and a bottom surface, the bottom surface of the base opposite the top surface of the base,
the at least two heater pillars extend from the top surface of the base to the pillar height,
the mixer component comprises a motor at the bottom surface of the base, and
the mixing element is configured on the top surface of the base.

5. The apparatus of claim 4, wherein:
the mixer component comprises a motor magnet,
the mixing element comprises a mixing magnet, and
the mixing element is magnetically secured on the top surface of the base via magnetic force between the motor magnet and the mixing magnet.

6. The apparatus of claim 1, wherein the base further comprises a volume sensor disposed on the base.

7. The apparatus of claim 1, further comprising a thermal sensor pillar extending from the base to a thermal sensor pillar height, wherein the thermal sensor pillar includes the thermal sensor.

8. The apparatus of claim 7, wherein:
the thermal sensor is a first thermal sensor,
the thermal sensor pillar comprises at least one second thermal sensor, and
the first and second thermal sensors are configured at different heights on the thermal sensor pillar relative to the base.

9. The apparatus of claim 1, further comprising a processor and a memory, the processor configured to execute instructions stored in the memory, the memory comprising instructions including:
measuring, with the thermal sensor, a temperature;
determining that the temperature is below a target temperature; and
powering, using a power source, the heating elements of the at least two heater pillars.

10. A heater configured to heat a liquid, the heater comprising:
a base having a liquid-facing side;
a heater pillar configured extending away from the base on the liquid-facing side of the base, the heater pillar comprising a heating element configured to generate heat when a voltage is applied across the heating element;
a thermal sensor configured to detect a temperature; and
a mixing element configured on the liquid-facing side of the base, the mixing element configured to agitate a liquid.

11. The heater of claim 10, further comprising a thermal sensor pillar configured extending away from the base on the liquid-facing side of the base, the thermal sensor pillar comprising the thermal sensor.

12. The heater of claim 11, wherein the thermal sensor is a first thermal sensor, and wherein the thermal sensor pillar comprises a second thermal sensor.

13. The heater of claim 10, further comprising a mixing motor, wherein the mixing motor is configured to cause the mixing element to agitate the liquid when the mixing motor is powered by a power source.

14. The heater of claim 13,
wherein the mixing motor comprises a motor magnet,
wherein the mixing element comprises a mixing magnet,
wherein the mixing motor is configured to cause the mixing element to agitate the liquid when the mixing motor is powered by a power source by the motor magnet rotating, causing the mixing element to rotate via magnetic force from the motor magnet.

15. The heater of claim 10, wherein:
the heater pillar is a first heater pillar and the heating element is a first heating element, and
the heater further comprises a second heater pillar configured extending away from the base on the liquid-facing side of the base, the second heater pillar comprising a second heating element configured to generate heat when a voltage is applied across the second heating element.

16. The heater of claim 15, further comprising:
a third heater pillar and a fourth heater pillar, the third heater pillar and the fourth heater pillar extending away from the base on the liquid-facing side of the base, the third heater pillar and the fourth heater pillar comprising a third heating element and a fourth heating element, respectively,
wherein the sensor pillar and the first, second, third, and fourth heater pillars are arranged equidistant apart on the base.

17. A heater comprising:
a base;
at least two heater pillars configured on the base, the at least two heater pillars each comprising a heating element configured to generate heat when powered;

a thermal sensor;

a power supply configured to power the heating elements of the at least two heater pillars;

a memory storing computer-executable instructions; and a processor configured to execute the computer-executable instructions stored in the memory, where the instructions include:

sensing, using the thermal sensor, a first temperature;

comparing the first temperature with a target temperature; and powering, by the power supply, the heating elements of the at least two heater pillars when the first temperature is less than the target temperature.

18. The heater of claim 17, further comprising a mixing component; wherein, the mixing component comprises a mixing motor and a mixing element, the mixing element is configured to rotate when power is applied to the mixing motor, and the instructions further include powering, by the power supply, the mixing motor while the heating elements of the at least two heater pillars are powered.

19. The heater of claim 18, further comprising a sensor pillar comprising the thermal sensor.

20. The heater of claim 19, wherein the mixing element is configured in a center of the at least two heater pillars and the sensor pillar.

\* \* \* \* \*